US008543595B2

(12) United States Patent
Frieder et al.

(10) Patent No.: US 8,543,595 B2
(45) Date of Patent: *Sep. 24, 2013

(54) METHOD FOR IMPROVING LOCAL DESCRIPTORS IN PEER-TO-PEER FILE SHARING

(75) Inventors: Ophir Frieder, Chicago, IL (US); Wai Gen Yee, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/465,472

(22) Filed: May 13, 2009

(65) Prior Publication Data

US 2009/0265349 A1 Oct. 22, 2009

Related U.S. Application Data

(63) Continuation of application No. 11/602,039, filed on Nov. 20, 2006, now Pat. No. 7,558,789.

(51) Int. Cl.
*G06F 17/30* (2006.01)
(52) U.S. Cl.
USPC ............................................ 707/770; 709/201
(58) Field of Classification Search
USPC .................. 707/749, 794, 795, 770; 709/201
See application file for complete search history.

(56) References Cited

U.S. PATENT DOCUMENTS

| 6,850,252 | B1 * | 2/2005 | Hoffberg ...................... 715/716 |
| 7,039,634 | B2 | 5/2006 | Xu et al. |
| 7,441,180 | B1 | 10/2008 | Kaczmarek et al. |
| 2002/0038307 | A1 * | 3/2002 | Obradovic et al. ........... 707/102 |
| 2002/0083025 | A1 * | 6/2002 | Robarts et al. .................. 706/12 |
| 2003/0115183 | A1 * | 6/2003 | Abdo et al. ...................... 707/3 |
| 2003/0134645 | A1 * | 7/2003 | Stern et al. ..................... 455/456 |
| 2003/0182270 | A1 | 9/2003 | Kuno et al. |
| 2004/0093321 | A1 | 5/2004 | Roustant et al. |
| 2005/0108203 | A1 | 5/2005 | Tang et al. |
| 2005/0144218 | A1 * | 6/2005 | Heintz .......................... 709/202 |
| 2007/0027957 | A1 | 2/2007 | Peters et al. |

OTHER PUBLICATIONS

Wai Gen Yee et al., Illinois Institute of Technology, Improved Result Ranking in P2P File-Sharing Systems by Probing for Metadata, In Proc. IEEE NCA, 2006.
Dongmei Jia et al., Illinois Institute of Technology, Automatic Tuning of File Descriptors in P2P File-Sharing Systems, In Proc. Wkshp on Web and Databases (WebDB), Jun. 30, 2006, pp. 57-62.
Gerald Salton and Chris Buckley, Improving Retrieval Performance by Relevance Feedback, Journal of the American Society for Information Science, Jun. 1990; 41, 4; ABI/INFORM Global, pp. 288-297.
Tor Klingberg and Raphael Manfredi, Gnutella Protocol v0.6 Specification Document, Jun. 2002, http://rfc-gnutella.sourceforge.net/src/rfc-0_6-draft.html.

* cited by examiner

*Primary Examiner* — Jorge A Casanova
(74) *Attorney, Agent, or Firm* — Pauley Petersen & Erickson

(57) ABSTRACT

A method for improving searches in a peer-to-peer (P2P) file sharing system that includes a plurality of server computers. A content file, identified by a descriptor including at least one metadata term and a mathematical identifier that uniquely identifies the content file in one of the server computers, is selected for searching. Other server computers are searched to find one or more matching content files; one that has a descriptor with a mathematical identifier matching the mathematical identifier of the first content file. The descriptors of the matching content files are returned to the searching server computer and used to expand the local descriptor.

26 Claims, 11 Drawing Sheets

FIG. 1
(Prior Art)

Files
Replica R1 of File F1: descriptor = {A, B, C | $K_{F1}$}.
Replica R2 of File F2: descriptor = {A, C | $K_{F2}$}
Replica R3 of File F1: descriptor = {A, B | $K_{F1}$}
Replica R4 of File F1: descriptor = {D | $K_{F1}$}
Replica R5 of File F2: descriptor = {F | $K_{F2}$}
Replica R6 of File F2: descriptor = {F, G | $K_{F2}$}
Replica R7 of File F2: descriptor = {H, I | $K_{F2}$}

Query invocation
Q1 Query {C} returns links to R1 {A, B, C | $K_{F1}$} & R2 {A, C | $K_{F2}$}
Q2 Query {B} returns links to R1 {A, B, C | $K_{F1}$} & R3 {A, B | $K_{F1}$}
Q3 Query {A} returns links to R1 {A, B, C | $K_{F1}$}, R2 {A, C | $K_{F2}$}, & R3 {A, B | $K_{F1}$}
Q4 Query {A, B, C} returns links to R1 {A, B, C | $K_{F1}$}
Q5 Query {A, B, C, D} returns no links Group by key K, (note – in conventional peer-to-peer file sharing systems, file name also possible)
Query {A}
 Group G1: R2 ($K_{F2}$)
 Group G2: R1 & R3 ($K_{F1}$)

Ranking (by Group Size)
 1. Group G2 ($K_{F1}$)
 2. Group G1 ($K_{F2}$)

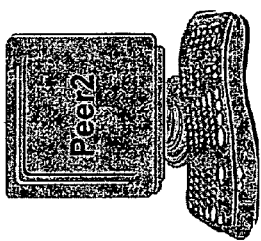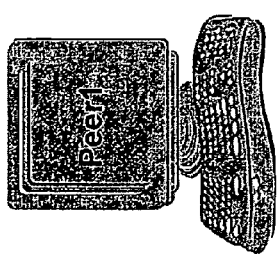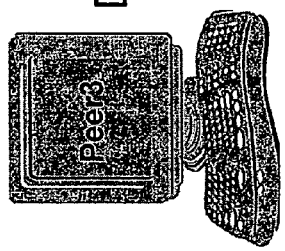
FIG. 2

MRR with Various Probe Triggering Techniques

Effect of Various Probing Rates on MRR

Responses per Query for Different Probing and Sampling Rates
The black line indicates cost without probing.

MRR with Different Probing and Sampling Rates
The black line indicates MRR without probing.

Recall and Precision with Various Probing Rates

METHOD FOR IMPROVING LOCAL DESCRIPTORS IN PEER-TO-PEER FILE SHARING

CROSS REFERENCE TO RELATED APPLICATION

This application is a continuation of U.S. patent application Ser. No. 11/602,039, filed on 20 Nov. 2006 now U.S. Pat. No. 7,558,789. The parent Patent Application is hereby incorporated by reference herein in its entirety and is made a part hereof, including but not limited to those portions which specifically appear hereinafter.

BACKGROUND OF THE INVENTION

Peer-to-peer (P2P) file sharing is a major peer-to-peer application, with millions of users sharing millions of files and consuming a large proportion of Internet bandwidth. In such a large-scale system, it is important to supply accurate, but yet, efficient search capabilities, lest the user be overwhelmed with search results. However, the search capabilities of these systems are generally weak, particularly in ranking query results.

In a pure peer-to-peer system, true clients and servers do not really exist because each node, i.e., computer, functions simultaneously as both a server and a client. However, as an aide to understanding the present invention, and not by way of limitation, the following terminology as may be used herein is explained. A client is a machine running a software routine seeking and receiving information. A server is a machine in the P2P file sharing system acting as a data repository and provider. A content file is a data object that is a unique set of data, e.g., song, picture, or any other thing in digital format. A replica is a copy of a content file. A node is one or more machines acting as one location in the network. A node will simply be referred to as a computer or "peer" herein, and is meant to encompass all automated data handling apparatuses.

Standard file sharing models include the common P2P file sharing systems Gnutella and Kazaa. These systems make very few assumptions about the behavior of users and about the data they share. Peers of a P2P file sharing system collectively share a set of content files by maintaining local replicas of them. Each replica of a content file (e.g., a music file) is identified by a descriptor. A descriptor is a metadata set, which includes user-readable terms (i.e., a "bag of words") and is typically implemented as a filename. Depending on the implementation, a term may be a single word or a phrase. P2P searching consists of identifying content files through a search of the descriptors of the individual content files.

A peer acts as a client by initiating a particular query for a content file. A query is also a metadata set, composed of terms that a user thinks best describe the desired content file. A query is generally routed to all reachable peers, which act as servers.

P2P file sharing systems generally have simple keyword-based data retrieval functions. In general, queries are conjunctive, so servers return references to file replicas whose descriptors contain all of the unique query terms. This containment condition is often referred to as the matching criterion. Each reference, which is generally referred to herein as a "result" or a "search result," contains the replica's descriptor and the identity of the server that returned it. The descriptor within the result helps the user and client distinguish the relevance of the content file to the query, and the server identity is required to initiate the content file's download.

Once the user selects a search result, a local replica of the corresponding content file is made by downloading it from the corresponding server. In addition, the user has the option of manipulating the local replica's descriptor in his own computer. He may manipulate it for personal identification or to better share it in the P2P file sharing system.

Traditional Information Retrieval (IR) techniques used to improve searching and result ranking are generally inapplicable in the P2P environment. Such techniques generally assume fixed architectures where dedicated servers manage statistics on the shared data and use them to generate a ranked list of results to return to the client. Such servers, however, do not exist in pure P2P environments; and even if they did, the set of shared data are constantly in flux due to the high churn rates (e.g., rate of joining and leaving the network) of participating peers. Reliable statistics are therefore hard to maintain.

Furthermore, servers in a P2P system independently maintain data and respond to queries. Each replica is annotated independently with metadata and may be particular to the user's tastes. For example, one user might annotate a particular Madonna song as "pop music," whereas another may annotate it as "80's music." Searches for this content file are complicated due to variations in the way it is identified.

Servers are also free to return whatever results they please in response to an incoming query, even being able to override the matching criterion. For example, a malicious server may send irrelevant marketing material or viruses in its responses. The client must aggregate the results from the disparate sources and try to rank them correctly to identify such spurious results.

In effect, P2P query processing is distinct from that of traditional search engines in that P2P query processing is a two-step process. The independent servers first generate responses to a query and then the clients must make sense of the responsive results. In contrast, in traditional IR systems, all data are centralized at a single site allowing a comprehensive search. This allows the creation of an integrated result set based on the global data set. Centralized servers can also perform optimizations, such as ranking results based on previous user selections.

Much of the known P2P improvement work proposes a focus on the network architecture of P2P file sharing systems to improve searching by identifying highly reliable peers, and giving them specialized roles in statistics maintenance, indexing, and routing. The performance of such systems can be impressive; however, the application domain is different than the one presently considered. The present invention makes no assumptions about the relative capabilities of the peers, and so is likewise applicable to ad hoc environments, where functionality is fully distributed among all participants.

SUMMARY OF THE INVENTION

The descriptors, e.g., filenames, of shared data in P2P file sharing systems are generally short, sparse, and static. The length and sparseness in description increase the difficulty for query processors to identify them and return them as search results. A general object of the invention is to provide a method for improving P2P searching by improving or enhancing local descriptors, for example, as a function of other peer descriptors for the same file. The method of one embodiment of this invention uses probe queries to aggregate the descriptions of a given file used by other peers in the P2P file sharing system. The peer issuing the probe query refines the local description of the file in a way that takes into consideration how others are describing their data, e.g., by adding or replacing terms.

The general object of the invention can be attained, at least in part, through an improvement to a method for searching a peer-to-peer (P2P) file sharing system of a plurality of server computers, where a search query is routed to the server computers for comparing query terms to a descriptor of each of a plurality of server content files in one or more of the server computers and returning as search results a descriptor of each of matching server content files, and where the descriptor includes at least one metadata term and a key. The improvement includes expanding a first descriptor of a content file of one of the server computers using a second descriptor of a matching server content file of another of the server computers.

The invention further comprehends a method for improving searches in a peer-to-peer (P2P) file sharing system that includes a plurality of server computers. The method includes selecting a first content file in one of the server computers. The first content file includes a first descriptor comprising at least one metadata term and a key that uniquely identifies the content file. The method further includes searching at least one other of the server computers to find a second content file having a second descriptor including a key matching the key of the first content file. The second descriptor is returned to the one of the server computers, and the first descriptor is expended using the second descriptor.

Known P2P file sharing search accuracy is generally poor; thus, there exists a need for its improvement. As is shown below, use of the present invention has been found experimentally to improve search accuracy over known P2P search approaches.

In the present invention, a peer computer initiates a query, generally referred to as "probe query" herein, to locate matching content files in other peers. In one embodiment of this invention, a probe query consists of a unique mathematical identifier, e.g., a hash key that globally, and for practical purposes uniquely, identifies the corresponding content file. Matching content files have the same unique mathematical identifier. It is assumed that each unique content file has this identifying mathematical identifier, also sometimes herein merely called a key, and this key is contained in all of the descriptors of all the replicas of a content file. If not provided for in the P2P system, then a key generator should be instituted.

The peer computer uses the descriptors of the probe query search results to add to, i.e., enhance, its own descriptor, thereby desirably providing a descriptor that increases the likelihood of matching a client search query within the P2P system. No new content files are added to the peer computer by the probe query of this invention.

It is noted that within other fields of traditional information management, such as Information Retrieval (IR) and Database Management Systems (DBMS), various schemes are used for refining searches. However, the techniques known in these fields are not considered analogous to the field of known P2P file sharing systems. For example, IR search engines are known to use a technique called Query Expansion, which in IR works by addition of terms to a query prior to an initial query execution. Query Expansion in IR is thus not relevant to the present invention. As another example, IR search engines are known to use a technique called relevance feedback (RF) as a way of improving the quality of search result ranking. But in the RF of traditional IR systems, typically a second query is the union of the original query terms with other metadata terms selected from the top N documents retrieved in response to the first query. This combination of the primary query terms with terms selected from the top documents retrieved in response to the primary query may and typically does introduce previously not present results to the result set. In DBMS, query results are by definition accurate. In DBMS searching, any query refinement is defined in terms of query optimization for timing performance, not accuracy of results. Thus, DBMS querying is unrelated to the present invention.

Considering "all available server nodes" it is contemplated by the present invention that processes for selective peer-to-peer communication may be instituted in the present system. Security systems may be instituted to allow either of the client nodes or server nodes to judge the desirability of sharing files or descriptors with particular nodes or classes of nodes. Such judgments may be based on any number of criteria, including the trustworthiness of the node, the quality of the node, the location or activity history of the node, etc.

References herein to "metadata" are to be understood to refer to data describing data. For example, the metadata of a content file (the "data") can include a file descriptor metadata terms, e.g., the owner's file name, a mathematical identifier, and a server identifier (identifying the location of the content file).

References herein to a "metadata term" are to be understood to refer to a human readable term associated with, e.g., naming, a content file.

References herein to a "mathematical identifier" are to be understood to refer to any computation on the file bit-stream or selected portion of the bit-stream used to determine identity, preferably, but not always unique identity. A hash value or hash key computed by application of a hash function on a file is an example of a mathematical identifier. The key may, for example, be automatically generated by hashing the bits of the content file using SHA-1 (see www.itl.nist.gov/fips-pubs/fip180-1.htm).

References herein to a "replica" are to be understood to refer to a copy of a content file. A unique mathematical identifier is associated with each unique content file, and all replicas of that content file have the same mathematical identifier.

References herein to a "server file" are to be understood to refer to a content file on a server computer. Server files are typically, but not necessarily, replicas.

References herein to a "probe query" or "probe" are to be understood to refer to the query of this invention by one server computer for the purpose of collecting metadata on a content file. References to a "client query" refer to searching by a computer (the client) for the purpose of downloading a content file. Probe queries search by mathematical identifiers, whereas client queries search by metadata terms.

Other objects and advantages will be apparent to those skilled in the art from the following detailed description taken in conjunction with the appended claims and drawings.

BRIEF DESCRIPTION OF THE DRAWINGS

FIG. 1 illustrates a P2P search using known techniques.

FIG. 2 is a simplified illustration showing a P2P search.

DETAILED DESCRIPTION OF EMBODIMENTS

Figure 3:
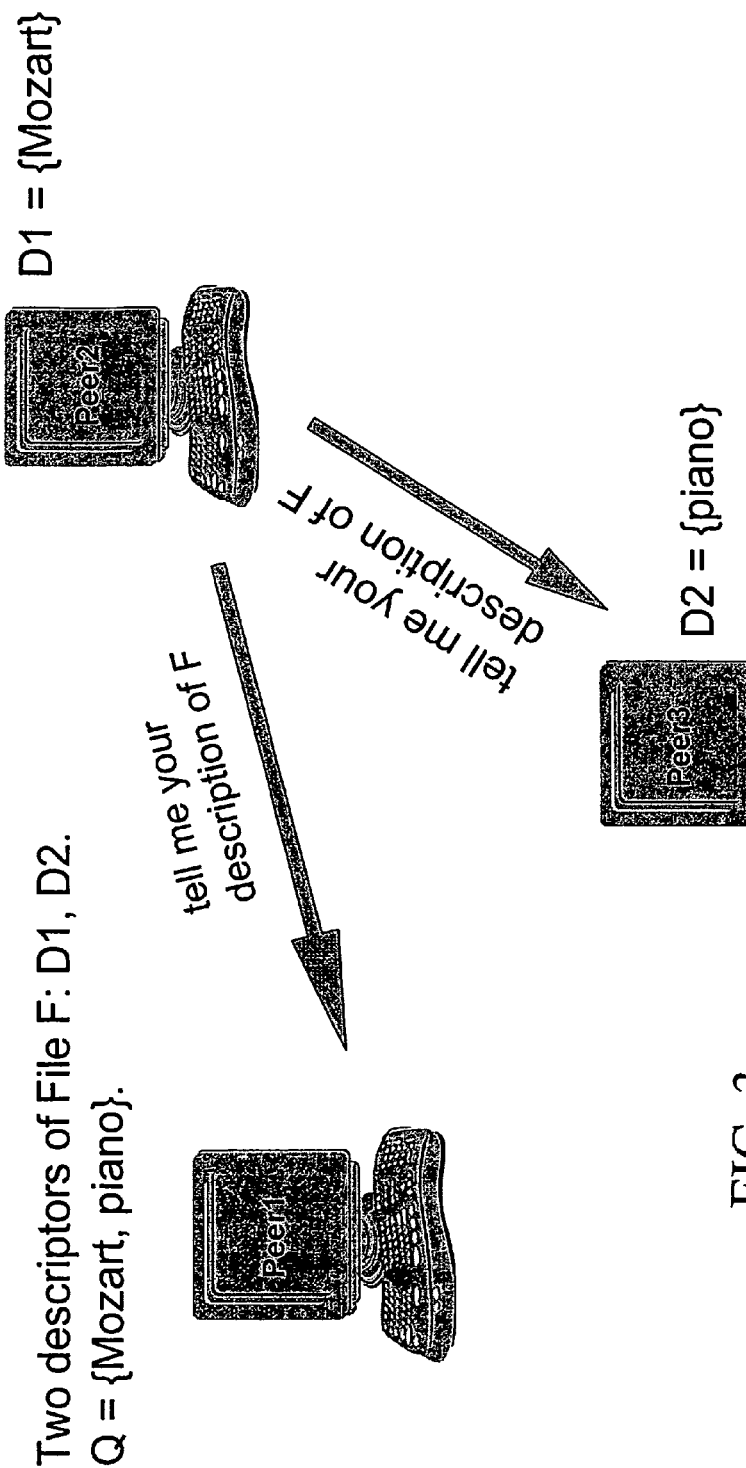
FIGS. 3-5 are simplified illustrations demonstrating an exemplary operation of the method of one embodiment of this invention.

Discussion of the present invention will be given herein with respect to specific exemplary embodiments that are in some cases arbitrarily or specifically designated for explanatory purposes. It will be appreciated by the person having ordinary skill in the art that aspects of the present invention may be arranged in a variety of ways and that other nomenclature than is used herein might be applied without doing violence to the spirit of the present invention. The invention illustratively disclosed herein suitably may be practiced in the absence of any element, part, step, component, or ingredient which is not specifically disclosed herein.

As seen in FIG. 1, an illustration of a known P2P search, there are two different content files, F1 and F2, which are contained among seven replicas, R1-R7. The metadata descriptors of the replicas contain word descriptors, or metadata terms, represented by the uppercase letters; and mathematical identifier hash keys, designated by "$K_i$". The replicas R1, R3 and R4 contain content file F1. The replicas R2 and R5-R7 contain content file F2. Each file has a different descriptor due to the metadata terms. But, within all the descriptors there are only two different hash keys, one for each unique content file. The content file desired by the user may, for example, be a song file. The metadata terms may be a song title, a band name, an album name, an abbreviated song title, etc., as devised by each peer and stored in the peer machine, i.e., a "server" in the present P2P description. The content file keys, $K_{F1}$ and $K_{F2}$, in the metadata, however, are derived from a hashing process performed by computer on the bit stream of the file data, and thus will be the same for each same content file.

Next, in FIG. 1, various queries, Q1-Q5, are initiated by a user, through a client machine, to try to find a desired song file, by using a word search, i.e., a metadata term search, illustrated by the uppercase letters in brackets. Remember that generally a search result will only be returned if the metadata term(s) of a replica's descriptor contain all of the search terms entered by the user. The search terms, or terms relating to the search terms, such as their equivalents as may be modified by a search engine via, for example but not limited to, stemming techniques, substring searches, or thesauri, are used for the primary search. Thus, the results of Q1-Q5 are listed in FIG. 1 as they would be returned. Q1 returns two replicas, each having one content file apiece. Q2 returns two replicas with one content file. Q3 returns three replicas, two with the F1 content file and one with the F2 content file. Q4 returns one replica. Q5 returns no replicas.

The conventional P2P system then groups the results, here for Query Q3, grouped into G1 and G2. In a conventional P2P search the results may be grouped by either of key or file name, although use of keys is illustrated in FIG. 1. The groups G1 and G2 are then ranked by group size, here according to group size as the primary search ranking metric, with G2 being the larger group and thus ranked and displayed as the number one result. Rank scores can be computed according to any of many known ranking criteria, e.g., group size, term frequency, cosine similarity, etc.

The method of one embodiment of the present invention improves searching in a P2P file sharing system by expanding a descriptor of a content file in one, and desirably many, server computers. The descriptor of the content file is expanded using a second descriptor of a matching server content file obtained from another server computer through what is referred to herein as a "probe query." Expanding descriptors in the server computers of the P2P system increases the likelihood the first descriptor will match a client query looking for the content file.

FIGS. 2-5 are much simplified illustrations demonstrating an exemplary operation and benefit of the method of one embodiment of this invention. FIG. 2 shows three computers (Peers1-3) of a P2P system. In FIG. 2, Peer1 is a client computer that transmits client query Q, containing query terms "Mozart" and "piano," to server computers Peer2 and Peer3. In FIG. 2, both Peer2 and Peer3 contain a file F with different descriptors, i.e., the mathematical identifiers are the same, but the metadata terms are different. Peer2 has "Mozart" as the only metadata term in its descriptor D1. Peer 3 has "piano" as the only metadata term in its descriptor D2. As the client query Q is conjunctive, and neither D1 nor D2 contains both terms "Mozart" and "piano," no search results are returned to Peer1 for query Q.

Figure 4:
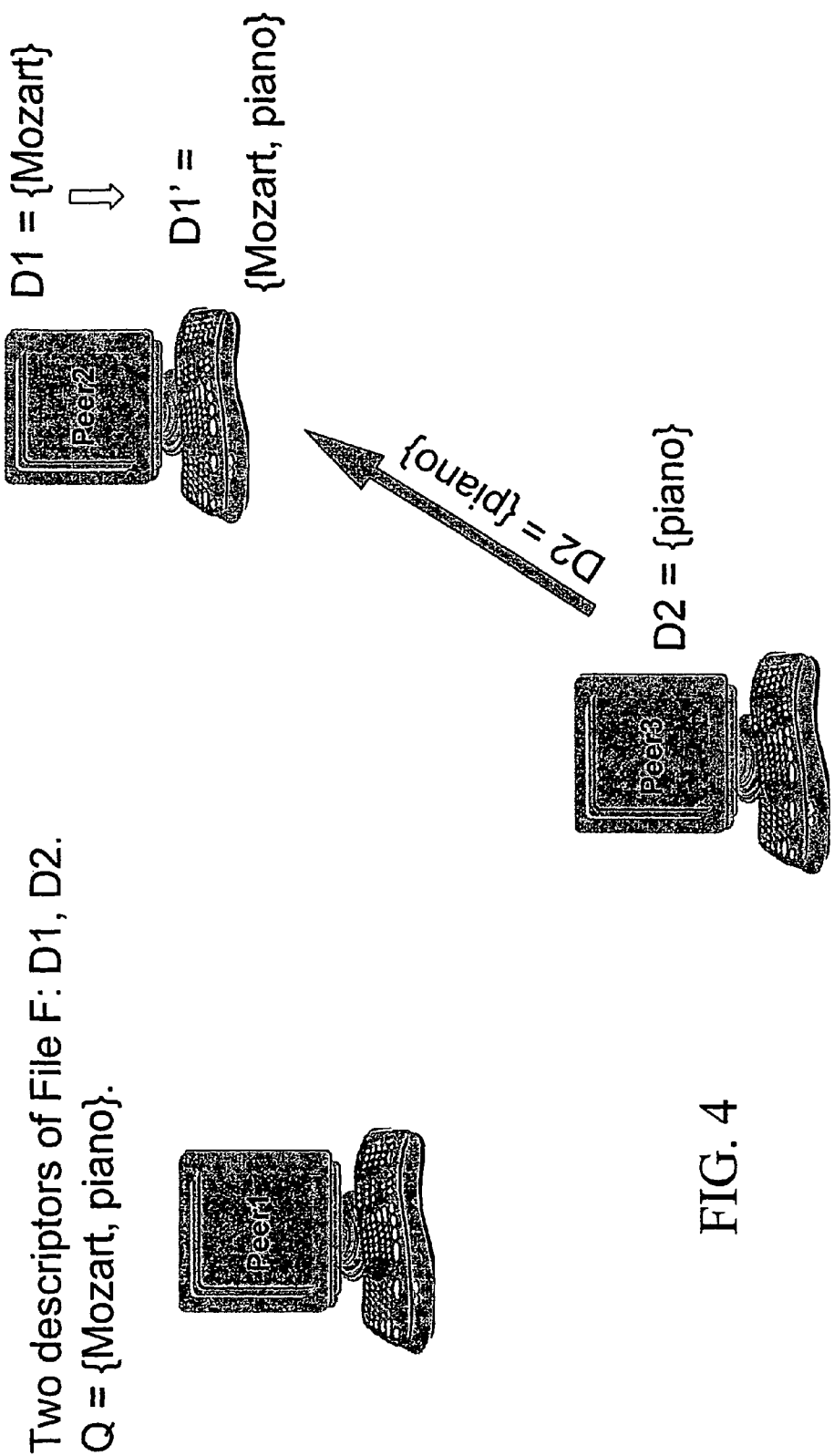
Figure 5:
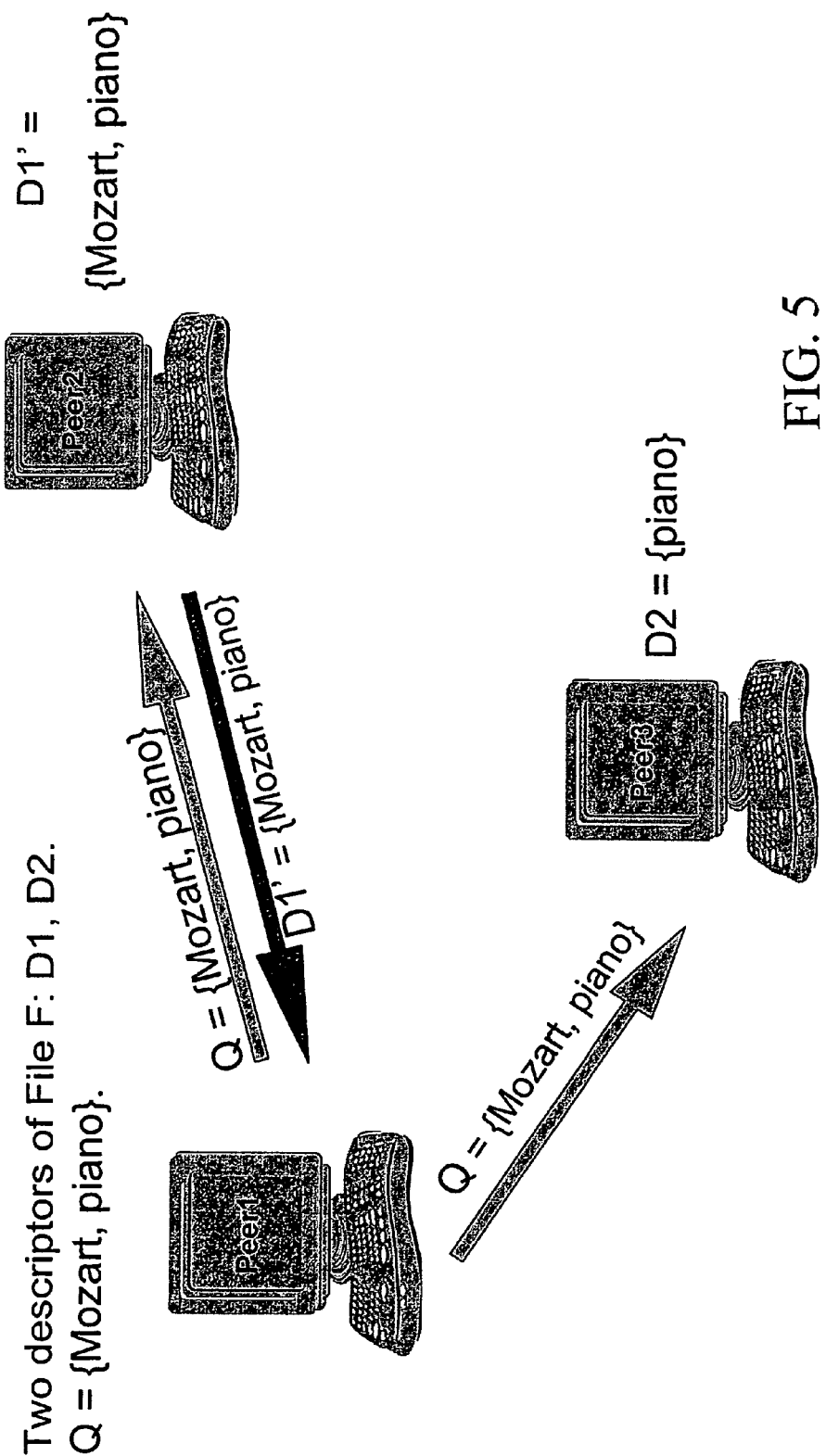

FIGS. 3-5 illustrate how the method of this invention can improve P2P searching by providing a search result for query Q in FIG. 2. Peer2 acts to expand the descriptor of the content file D1, to increase the likelihood the Peer2 descriptor will match a client query (query Q in this example) looking for the content file, based upon one or more descriptors of matching server content files from one or more other server computers.

In FIG. 3, Peer2 selects content file D1 and searches, i.e., probe queries, computers Peer1 and Peer3 to find another content file having a second descriptor including a unique mathematical identifier, e.g., a key, matching the key of the content file D1. In one embodiment of this invention, the probe query search of the other peers is conducted by routing the key of the content file D1 to server computers Peer1 and Peer3 and comparing the key of the content file D1 to a key of each of one or more descriptors within Peer1 and Peer3.

As illustrated in FIG. 3, Peer2 is essentially asking the other server computers of the P2P system for their name of file F. In FIG. 4, as Peer3 is the only server computer having file F (i.e., a file having a matching key) in this exemplary embodiment, Peer3 returns its descriptor of file F to Peer2. Peer2 uses the metadata term "piano" of Peer3's descriptor D2 to expand Peer2's own descriptor by incorporating the metadata term "piano" from the descriptor D2 into the descriptor D1. The result is that Peer2's new descriptor D1' of file F contains both metadata terms "Mozart" and "piano."

As will be appreciated by those skilled in the art following the teachings herein provided, the probe query performed by an inquiring or probing computer (Peer2) according to this invention in a real-world P2P system is likely to return a plurality of descriptors, each including a key matching the key of inquiring computer's content file and likely different metadata terms, from many other server computers. In such instances, according to one embodiment of this invention, the inquiring computer desirably selects one or more, but not always all, of the metadata terms of the returned descriptors for incorporating into the probing computers descriptor.

Various techniques are available for selecting which metadata term(s) is/are to be incorporated into the probing computer's descriptor. In one embodiment, the selected metadata term is the metadata term appearing most or least frequently in the plurality of returned descriptors. In another embodiment, the incorporated metadata term is randomly selected from the plurality of returned descriptors. In still another embodiment of this invention, a predetermined metadata term limit is desirably established for the inquiring computer's descriptor, and the number of incorporated metadata terms does not exceed the predetermined metadata term limit.

Desirably, in one embodiment of this invention, not all server computers having a matching content file with a key matching the key of the content file of the probe query return the descriptor to the probing computer. In this embodiment, the consumption of extra Internet bandwidth that can occur by implementing the additional, and desirably automatic, searches according to this invention can be reduced, while still improving searching. In one embodiment of this invention, each of the server computers returns the matching content file descriptor according to a given probability. Also, the techniques of the method of this invention can be implemented only during, for example, lower network traffic times.

FIG. 5 illustrates the results of Peer1's query Q (of FIG. 2) after Peer2 has enhanced its descriptor for file F using Peer3's descriptor according to this invention. Query Q ({Mozart, piano}) is routed to both Peer2 and Peer3, as in FIG. 2. Also similar to FIG. 2, Peer3 returns no search result, as the descriptor D2 still does not match the query Q. However, the enhanced descriptor D1' of Peer2 now matches the query Q, and the descriptor D1' is returned to Peer1 as a search result.

The method of this invention is desirably automatically implemented by software, but can also be user implemented, such as manually or according to a user established parameter. The software for implementing the method of this invention can be integrated with or bundled with the protocol software for the P2P system, such as Gnutella or Kazaa P2P file sharing protocol programs. However, it is still within the scope of this invention to map this approach into hardware, such as an Application Specific Integrated Circuit (ASIC) or via a Field Programmable Gate Array (FPGA).

Desirably, a server computer is set to automatically implement a probe query and to search for a matching server content file of one or more other server computers upon a predetermined time or condition. In one embodiment, a peer computer automatically searches for a matching server content for enhancing a descriptor of a file when the server computer, during a predetermined time period, has returned a number of responses to received client queries that is less than a predetermined number. Thus, the probing is done when the computer is not busy and under-utilized, which is desirably measured by the number of response returned to inquiring client computers over a particular time period.

Another available option is to conduct the probe query when a peer has a high desire to participate in the P2P system. This can be determined by the number of files published by the peer, e.g., automatically searching for matching server content files when the number of peer files available for sharing reaches a predetermined number. In one embodiment, this is a parameter set by the user.

A peer can also automatically conduct a probe query when the peer, or P2P system in general, is active. The activity is desirably measured by the number of queries received, e.g., automatically searching for a matching server content file as a function of the number of search queries received by the peer during a predetermined time period.

In one embodiment of this invention, the automatic probe query is conducted upon a triggering mechanism. For example, the search can be done according to:

$$T < [N_f N_q/(N_r+1)] - N_p T,$$

where T is a user-defined threshold, $N_f$ is a number of content files available for sharing, $N_q$ is a number of search queries received, $N_r$ is a number of responses returned in response to received client queries, and $N_p$ is the number of probe queries already performed. One benefit of this embodiment is that all the metrics are locally collected and maintained and thus it is generally easy to implement.

Another issue is which content file the peer should select for descriptor enhancement according to this invention. In one embodiment, a poorly or sparsely described file should be probe queried. For example, the file chosen for probe querying desirably is one that has a descriptor that includes the fewest metadata terms, or has matched the fewest received search queries over a predetermined time period. The rationale is that a smaller descriptor is harder to match, and a lower number of query matches can indicate poor description. A potential problem is that when a file is simply unpopular it may always match the fewest queries, and be probed repeatedly and unnecessarily. Thus, in one embodiment of this invention, after probing a local file, the file's search query "match count" is artificially increased, by, for example and without limitation, doubling, tripling, or adding a constant thereto, thereby decreasing the likelihood that it will have the lowest number of query matches at the time of the next probing.

Figure 6:
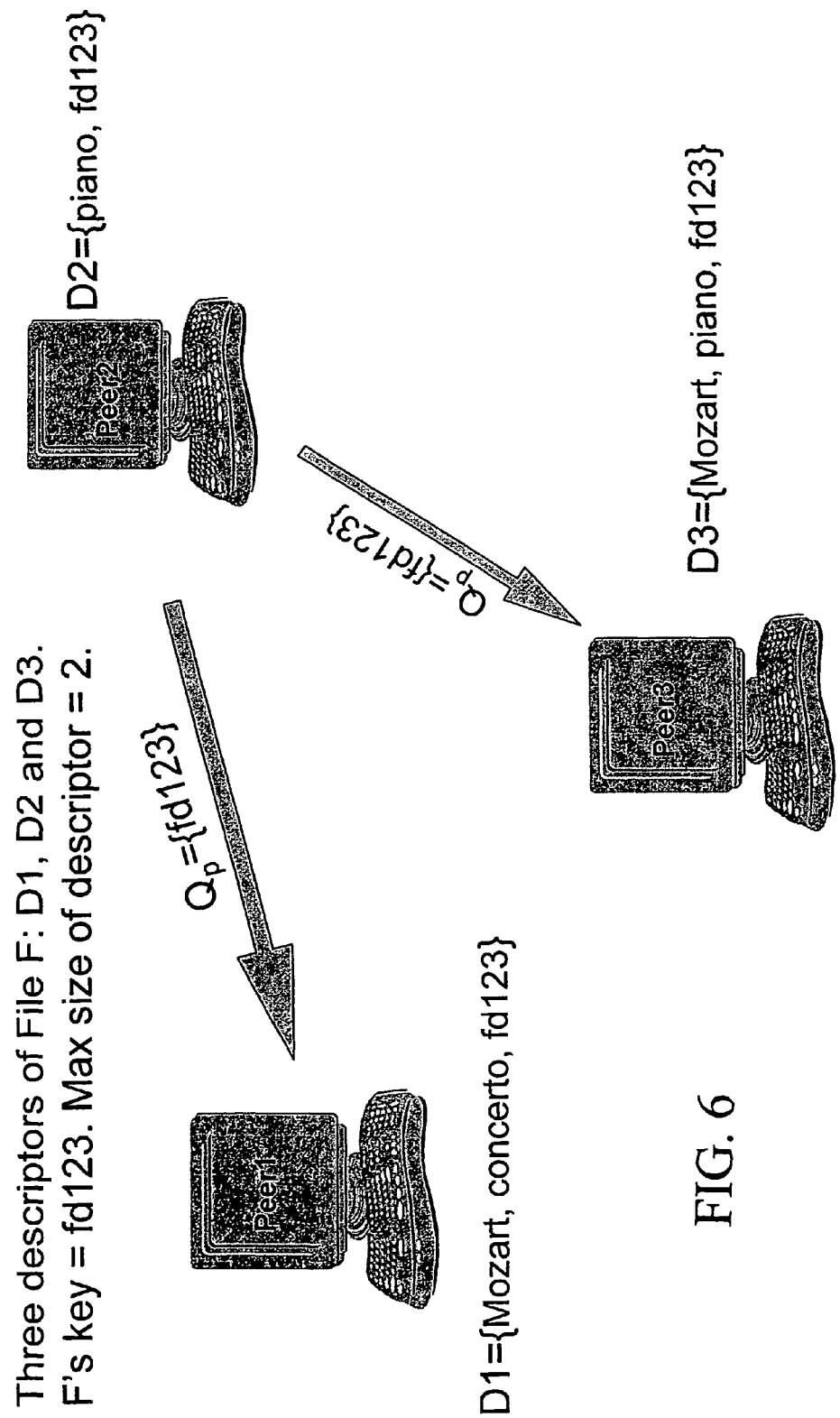
FIGS. 6-8 are simplified illustrations demonstrating an exemplary operation of the method of another embodiment of this invention.
Figure 7:
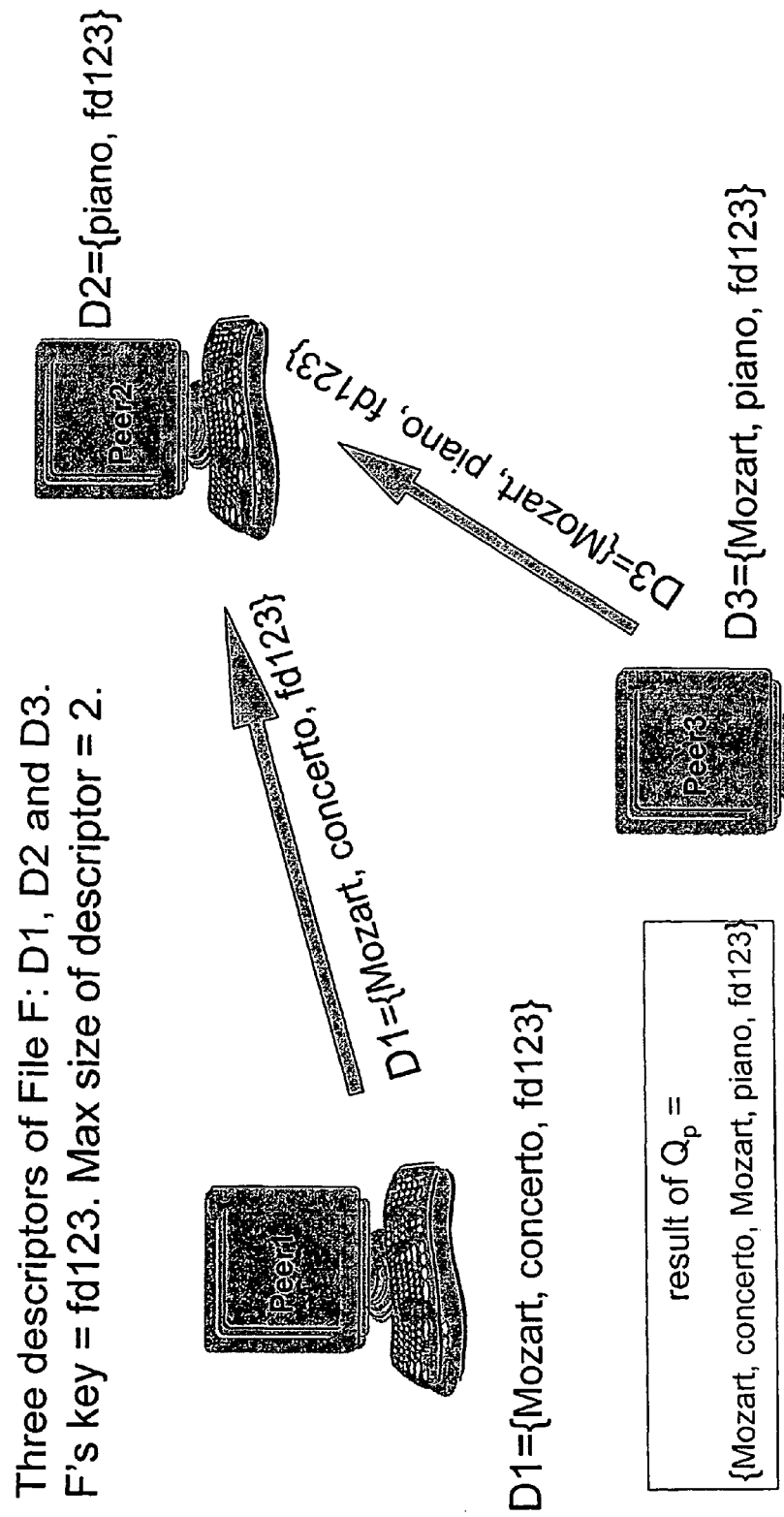
Figure 8:
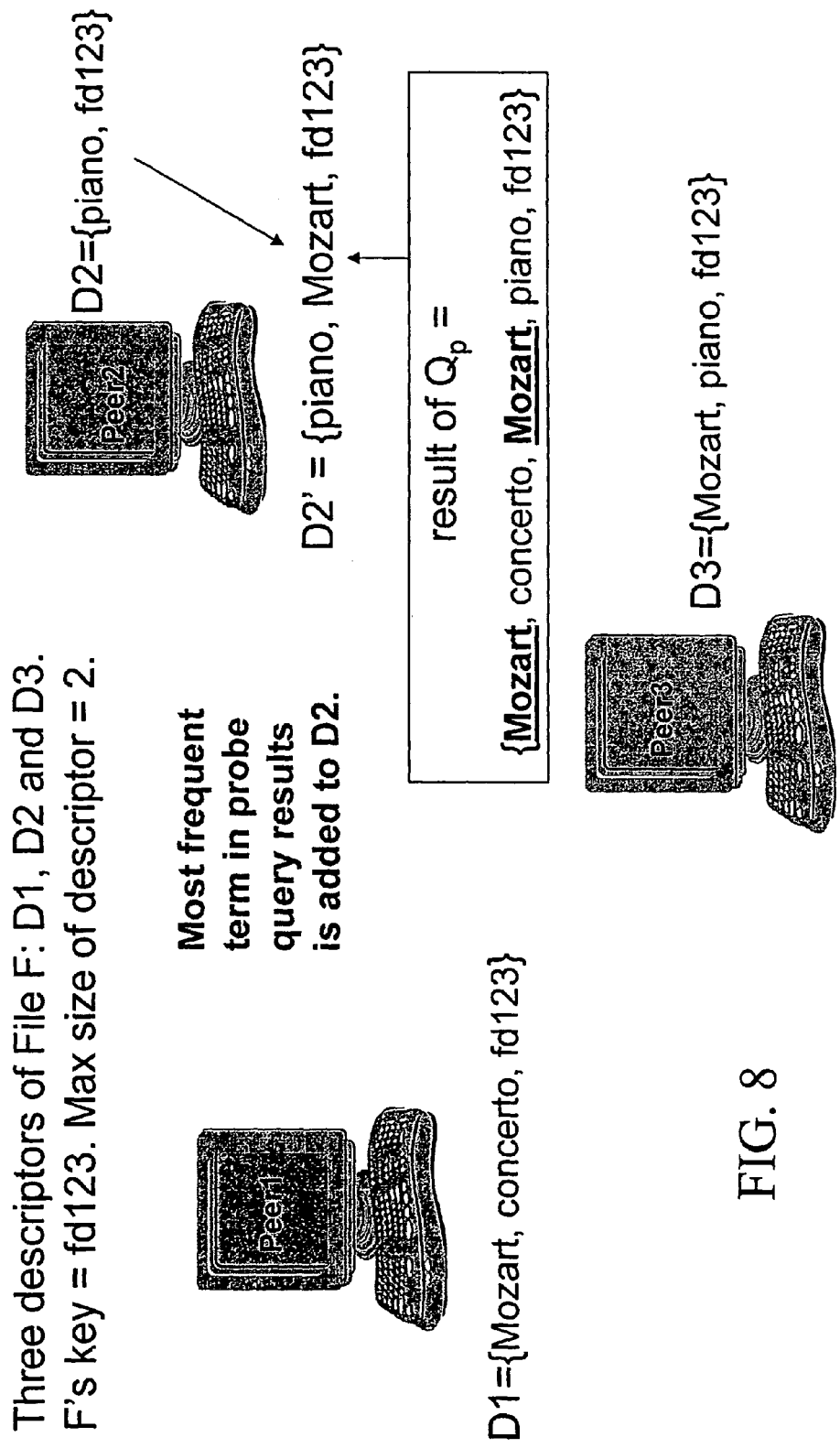

FIGS. 6-8 illustrate a probe query according to a different embodiment of this invention. In FIG. 6, Peer2 initiates a probe query $Q_p$ for a content file F having a descriptor D2 with metadata term "piano" and key "fd123." Content file F has a preset maximum size of two metadata terms in the descriptor. Probe query $Q_p$ seeks the descriptors of any content file having a matching key (fd123) from Peer1 and Peer3. Peer1 has a matching content file, with key fd123 and metadata terms "Mozart" and "concerto." Peer3 also has a matching content file, with key fd123 and metadata terms "Mozart" and "piano."

In FIG. 7, Peer1 and Peer3 return descriptors D1 and D3, respectively, to Peer2. Peer2 will use the descriptors D1 and D3 to enhance the descriptor D2. As shown in the box, the combined descriptor result of probe query $Q_p$ is {Mozart, concerto, Mozart, piano, fd123}. However, as Peer2 has a metadata term limit of two, not all of the metadata terms of the search results can be added to D2. In FIG. 8, the most frequent term of the query results ("Mozart") is added to D2. The enhanced descriptor D2' for content file F is {piano, Mozart, fd123}.

The present invention is described in further detail in connection with the following descriptions which illustrate or simulate various aspects involved in the practice of the invention. It is to be understood that all changes that come within the spirit of the invention are desired to be protected and thus the invention is not to be construed as limited by these examples.

To further demonstrate benefits of the present invention, the performance of a P2P file-sharing system was simulated. In accordance with the model described in M. T. Schlosser, T. E. Condie, and S. D. Kamvar, *Simulating a file-sharing p2p network*, in The Proceedings of the Workshop on Semantics in Peer-to-Peer and Grid Computing (May 2003), and observations presented in S. Saroiu, P. K. Gummadi, and S. D. Gribble, *A measurement study of peer-to-peer file sharing systems*, in The Proceedings of the Workshop on Multimedia Computing and Networking (MMCN) (January 2002), the experimental model was enhanced with interest categories, which model the fact that some users have stronger interests in some subsets of data than other. The set shared files O was partitioned into sets $C_i$, where $C_i \subset O$, $C_i \cap C_j = \emptyset$ if $i \neq j$, and $\cup_i C_i = O$. At initialization, each peer "s" from set of peers P was assigned some interests $I_s \subseteq \cup_i C_i$, and was allocated a set of replicas $R_s$ from this interest set: $R_s=\{r^o{}_s|o\in\cup_i C_i,$ where $C_i\in I_s\}$, where $r^o{}_s$ is peer s's replica of content file "o". For each replica $r^o{}_s$ allocated at initialization, $d(r^i{}_s)\subset M$, where $d(r^i{}_s)$ is the descriptor of $r^i{}_s$ and M is the universal set of terms. The distribution of terms within $r^i{}_s$ follows a pre-defined term distribution. Peer s's interest categories also constrain its searches; it only searches for files from $\cup_i L_i$, where $L_i\in I_s$.

Each category $C_i$ had an assigned popularity, $b_i$, which described how likely it is to be assigned to a peer. The values of $b_i$ followed the Zipf distribution. Within each interest category, each file varied in popularity, which was also skewed according to the Zipf distribution. This popularity governs the likelihood that a peer who has the file's interest category is either initialized with a replica of the file or decides to search for it.

Peers in the simulator are populated with TREC data from the 2 GB Web Track (WT2G), where Web domains, documents in the domains, and terms in the documents are mapped to interest categories, files in categories, and files' valid terms, respectively. Term distributions used to randomly initialize the descriptors of the initial set of replicas were based on the term distributions within the Web pages. An initial set of replicas with random descriptors of associated terms was allocated to peers based on pre-assigned interest categories. Queries for files were generated using valid terms with a length distribution typical of that found in Web search engines as shown in Table 1, and also exhibited in real P2P file-sharing system query logs.

TABLE 1

Query Length Distribution.

| Length | 1 | 2 | 3 | 4 | 5 | 6 | 7 | 8 |
|---|---|---|---|---|---|---|---|---|
| Prob. | .28 | .30 | .18 | .13 | .05 | .03 | .02 | .01 |

The simulation parameters shown in Table 2 were based on observations of real-world P2P file-sharing systems and were comparable to the parameters used in the literature. The data set used consisted of an arbitrary set of 1,000 Web documents from 37 Web domains. Terms are stemmed, and HTML markup and stop words were removed. The final data set contained 800,000 terms, 37,000 of which are unique. Although other behavior is possible, it was assumed that the user identifies and downloads the desired result group with a probability $1/r$, where $r\geq 1$ is its position in the ranked set of results. If the result is not in the result set, r was set to infinity.

TABLE 2

Parameters Used in the Simulation.

| Parameter | Value(s) |
|---|---|
| Num. Peers | 1000 |
| Num. Queries | 10,000 |
| Max. descriptor size (terms) | 20 |
| Num. terms in initial descriptors | 3-10 |
| Num. categories of interest per peer | 2-5 |
| Num. files per peer at initialization | 10-30 |
| Num. trials per experiment | 10 |

Performance was measured using a standard metric known as mean reciprocal rank score (MRR), defined as:

$$MRR = \frac{\sum_{i=1}^{N_q} \frac{1}{rank_i}}{N_q},$$

where $N_q$ is the number of queries and $r_i$ is the rank of the desired file in query i's result set (again, $r_i=\infty$ if the desired result is not contained in the result set). MRR is an appropriate metric in applications where the user is looking for a single, particular result.

For reference, the precision and recall metrics are also recorded, which have slightly different definitions than they do in traditional information retrieval (IR) research, due to the fact that replicas exist in the P2P file-sharing environment, and assuming that queries are for particular files. With "A" being the global set of replicas of the desired file, and "R" being the result set of the query. Precision and recall are defined as:

$$precision = \frac{|A \cap R|}{|R|},$$

$$recall = \frac{|A \cap R|}{|A|}.$$

These more traditional IR metrics are useful in roughly diagnosing the performance of query processing and in generalizing the presented performance to other domains.

Triggering the Probe

For the probing cases, 5,000 probes were performed. To do this using the probe triggering mechanism T discussed above, T was tuned so that, after 10,000 content file queries, approximately 5,000 probe queries were issued. For random probing, each peer was assigned a probability of issuing a probe query during each iteration of the simulation so that after 10,000 content file queries, 5,000 probe queries were issued.

Figure 9:
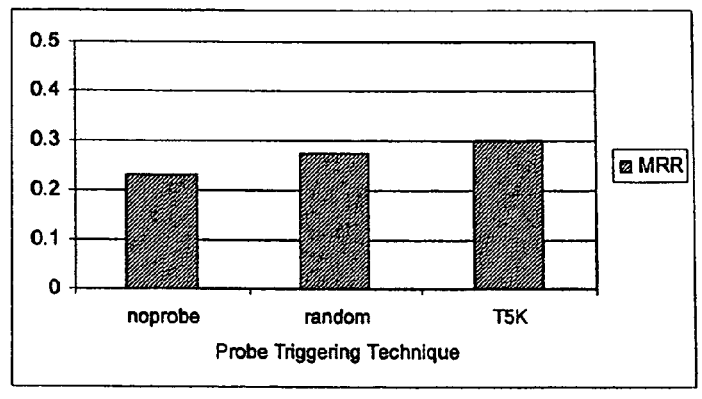
FIG. 9 is a graph showing accuracy in terms of MRR for various exemplary probe triggering techniques.

The experimental results shown in FIG. 9 indicate that probe queries according to this invention improve client query performance. Probing randomly increased MRR by 20%. Probing using the threshold, however, increased MRR by 30%.

Figure 10:
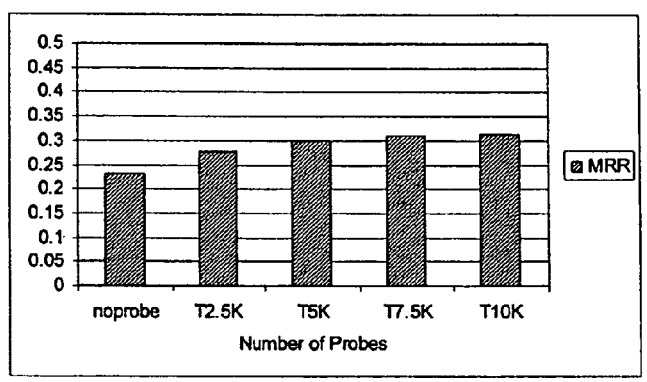
FIG. 10 is a graph showing the effect of various exemplary probing rates on MRR.

Experiments were also performed with a varied threshold T. To control these experiments, T was set to values such that, after 10,000 content file queries, there were 2,500, 5,000, 7,500, and 10,000 probes. The results, shown in FIG. 10 are intuitive. As the number of probes increases, so does performance. However, the rate of performance increase decreases with an increasing number of probes. The conclusion is that additional probes have diminishing value.

Cost Analysis

Cost is defined as the number of query responses received by the client. This metric roughly estimates the amount of work the client must perform to process a query. More importantly, this metric roughly estimates cost in terms of network load in a topology-independent way.

Probing according to this invention increases the cost of each query. By enhancing data description, the likelihood that a query will match some file is increased. The increase in cost can be significant.

To counter this cost, in one embodiment, a server-side Bernoulli sampling of the result set is used for each query. That is, for each matching result for a query, the server decides to return it to the client with a fixed probability Pr, $0\leq Pr\leq 1$. This type of sampling is expected to preserve the overall distribution of terms and results in the result set, although the result set is smaller. It also allows the predictable reduction in cost by a factor Pr. In the experiments below, the probe file selection was based upon a criterion, such as having a short descriptor or being infrequently returned as a search result. The results for random probe file selection were similar.

Figure 11:
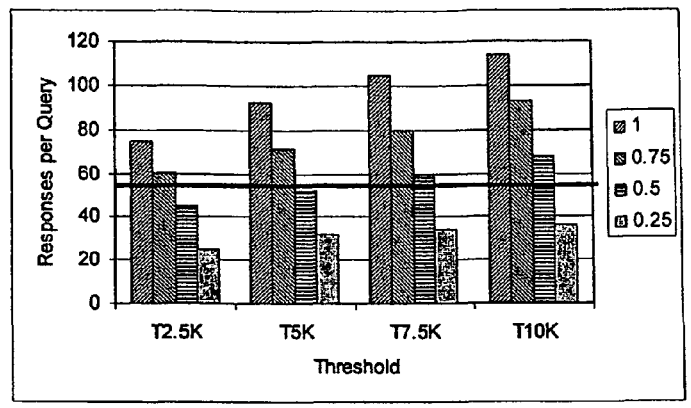
FIG. 11 is a graph showing the responses per query for different exemplary probing and sampling rates.

As shown in FIG. 11, cost can be as high as 100% with varying thresholds if sampling is not used. Predictably, with sampling, costs are reduced by, approximately, a factor Pr. The cost decrease factor is slightly greater than Pr because, in a well-running P2P file-sharing system, the average number of results per query is high because more peers are actively sharing more files.

Sampling, in fact, is able to reduce the cost of probing to levels below that of not probing with no sampling. This decrease in cost from the base case can be over 50%. Sampling, however, has a negative impact on MRR. This is the case because it is likely that, for some queries, the desired result will be sampled out of the result set. The question is whether the decrease in MRR offsets the improvements in cost.

Figure 12:
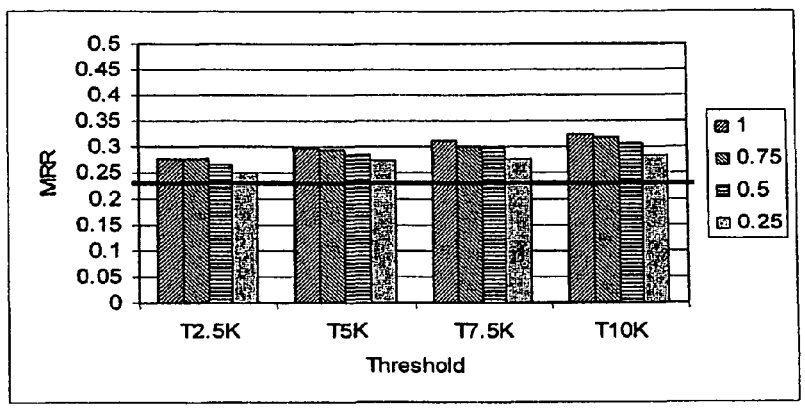
FIG. 12 is a graph showing exemplary MRR with different probing and sampling rates.

Fortunately, MRR gains generally decrease at a slower rate than cost, as shown in FIG. 12. In these experiments, MRR is never worse than when not using probing. For example, when using T10K probing and 25% sampling, MRR is approximately 20% better than when not probing according to this invention, and cost is 35% lower. Probing with sampling can therefore lead to a win-win situation in terms of both ranking performance and cost. Based on this performance, in one embodiment, it is desirable to have a probing system that maximizes probing rate, and then reduces cost, via sampling, as necessary.

Figure 13:
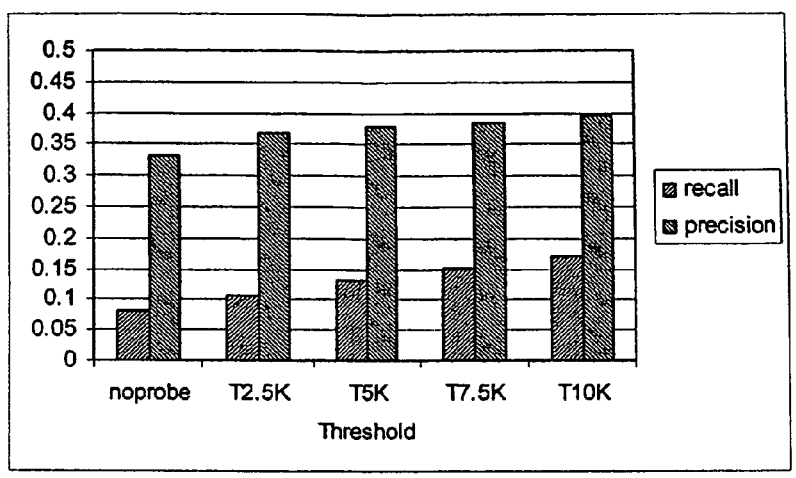
FIG. 13 is a graph showing exemplary recall and precision with various probing rates.

The reason for this positive performance/cost behavior is generally due to the effect of probing on recall and precision. Result sets are generally of a higher quality in terms of these two metrics as shown in FIG. 13. The increased precision in particular, reduces the likelihood that sampling will eliminate all relevant results from a result set.

Given the conjunctive matching criterion of today's P2P file-sharing systems, poor data description limits overall performance. The method of this invention helps solve this problem by automatically tuning local descriptors using those of peers. Our experimental findings demonstrate that it is possible to improve performance with probes with very little (potentially negative) cost.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. In a method for searching a peer-to-peer (P2P) file sharing system of a plurality of server computers, wherein a search query is routed to the server computers for comparing query terms to a descriptor of each of a plurality of server content files in one or more of the server computers and returning as search results a descriptor of each of matching server content files, and wherein the descriptor includes at least one metadata term and a key, the improvement comprising:

expanding a first descriptor of a content file of one of the server computers by adding to the first descriptor of the content file a metadata term of a second descriptor of a matching server content file of another of the server computers, wherein the second descriptor includes a key matching the first descriptor.

2. The method of claim 1, wherein expanding the first descriptor increases the likelihood the first descriptor will match a query looking for the content file.

3. The method of claim 1, further comprising automatically searching for the matching server content file of another of the server computers.

4. The method of claim 3, wherein searching for the matching server content file comprises comparing a key of the first content file to a key of each of one or more descriptors of the another of the server computers.

5. The method of claim 3, further comprising automatically searching for the matching server content file when the one of the server computers, during a predetermined time period, has returned a number of responses to received search queries that is less than a predetermined number.

6. The method of claim 3, comprising automatically searching for the matching server content file as a function of the number of search queries received by the one of the server computers during a predetermined time period.

7. The method of claim 3, comprising automatically searching for the matching server content file when a number of files available for sharing reaches a predetermined number.

8. The method of claim 3, further comprising automatically searching for the matching server content file according to a user established parameter.

9. The method of claim 1, wherein the first descriptor is a descriptor of the one of the server computers that includes the fewest metadata terms or has matched the fewest received search queries over predetermined time period.

10. The method of claim 1, wherein the first descriptor has matched the fewest received search queries over a predetermined time period, and further comprising artificially increasing a search query match count after expanding the first descriptor.

11. Hardware for implementing the method of claim 1.

12. The hardware of claim 11, comprising an Application Specific Integrated Circuit (ASIC) or a Field Programmable Gate Array (FPGA).

13. A method for improving searches in a peer-to-peer (P2P) file sharing system including a plurality of server computers, the method comprising:

one of the server computers automatically selecting a first content file of the one of the server computers, wherein the first content file includes a first descriptor comprising at least one metadata term and a key that uniquely identifies the content file;

the one of the server computers automatically searching at least one other of the server computers to find a second content file having a second descriptor including a key matching the key of the first content file;

one of the at least one other of the server computers returning the second descriptor to the one of the server computers;

the one of the server computers automatically expanding the first descriptor to obtain an expanded first descriptor by adding a second metadata term of the second descriptor that is different from each of the at least one metadata term of the first descriptor; and the one of the server computers storing the content file with the expanded first descriptor.

14. The method according to claim 13, wherein searching the at least one other of the server computers comprises:

routing the key of the first content file to the at least one other of the server computers; and comparing the key of the first content file to a key of each of one or more descriptors of the at least one other of the server computers.

15. The method of claim 13, further comprising:
returning a plurality of descriptors from the at least one other of the server computers, each including a key matching the key of the first content file; and
selecting from the plurality of descriptors a metadata term that is not in the first descriptor; and
incorporating the metadata term from the plurality of descriptors into the first descriptor.

16. The method of claim 15, further comprising selecting as the metadata term the metadata term appearing most or least frequently in the plurality of descriptors.

17. The method of claim 15, further comprising randomly selecting the metadata term.

18. The method of claim 15, further comprising:
establishing a predetermined metadata term limit for the first descriptor;
selecting from the plurality of descriptors more than one metadata term that is not in the first descriptor; and
incorporating the more than one metadata term from the plurality of descriptors into the first descriptor, wherein the predetermined metadata term limit is not exceeded.

19. The method of claim 15, wherein each of the at least one of the other of the server computers that has a matching content file with a key matching the key of the first content file returns a matching content file descriptor according to a given probability.

20. The method of claim 13, further comprising automatically selecting and searching the first content file when the one of the server computers, during a predetermined time period, has returned a number of responses to received search queries that is less than a predetermined number.

21. The method of claim 13, further comprising automatically selecting and searching the first content file as a function of the number of search queries received by the one of the server computers during a predetermined time period.

22. The method of claim 13, further comprising automatically selecting and searching the first content file when a number of files on the one of the server computers available for sharing reaches a predetermined number.

23. The method of claim 13, further comprising selecting as the first content file a server content file having a descriptor that includes the fewest metadata terms or has matched the fewest received search queries over a predetermined time period.

24. The method of claim 13, further comprising:
selecting as the first content file a server content file having a descriptor that has matched the fewest received search queries over a predetermined time period; and
artificially increasing a search query match count for the first content file after expanding the first descriptor.

25. A method for improving searches in a peer-to-peer (P2P) file sharing system including a plurality of server computers, the method comprising:
a first server computer automatically selecting a first content file of the first server computer, wherein the first content file includes a first descriptor comprising at least one metadata term and a key that uniquely identifies the content file;
the first server computer automatically routing the key to a second server computer to search for a second content file having a second key matching the key of the first content file;
the second server computer returning a second descriptor of the second content file to the first server computer, the second descriptor including a second descriptor metadata term that is different from each of the at least one metadata term of the first descriptor;
the first server computer automatically adding the second descriptor metadata term to the first descriptor to obtain an expanded first descriptor; and
the first server computer storing the first content file with the expanded first descriptor.

26. The method of claim 25, wherein the expanded first descriptor identifies the first content file for future querying of the first server computer by a third server computer.

* * * * *